(12) United States Patent
Tendjoukian et al.

(10) Patent No.: US 8,364,611 B2
(45) Date of Patent: Jan. 29, 2013

(54) SYSTEM AND METHOD FOR PRECACHING INFORMATION ON A MOBILE DEVICE

(75) Inventors: Meher Tendjoukian, Burlingame, CA (US); Marc Eliot Davis, San Francisco, CA (US); Christopher William Higgins, Portland, OR (US)

(73) Assignee: Yahoo! Inc., Sunnyvale, CA (US)

( * ) Notice: Subject to any disclaimer, the term of this patent is extended or adjusted under 35 U.S.C. 154(b) by 743 days.

(21) Appl. No.: 12/540,588

(22) Filed: Aug. 13, 2009

(65) Prior Publication Data

US 2011/0040718 A1 Feb. 17, 2011

(51) Int. Cl.
G06F 15/18 (2006.01)
G06F 15/00 (2006.01)

(52) U.S. Cl. ............................................. 706/12; 706/62

(58) Field of Classification Search .................. 706/62, 706/12

See application file for complete search history.

(56) References Cited

U.S. PATENT DOCUMENTS

| | | |
|---|---|---|
| 5,446,891 A | 8/1995 | Kaplan et al. |
| 5,493,692 A | 2/1996 | Theimer et al. |
| 5,583,763 A | 12/1996 | Atcheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |
| 5,835,087 A | 11/1998 | Herz |
| 5,903,848 A | 5/1999 | Takahashi |
| 5,920,854 A | 7/1999 | Kirsch et al. |
| 6,014,638 A | 1/2000 | Burge et al. |
| 6,021,403 A | 2/2000 | Horvitz et al. |

(Continued)

FOREIGN PATENT DOCUMENTS

| | | |
|---|---|---|
| EP | 1362302 | 11/2003 |
| JP | 2002312559 | 10/2002 |

(Continued)

OTHER PUBLICATIONS

S. Byna et al., "A Taxonomy of Data Prefetching Mechanisms", Int'l Symp. on Parallel Arch., Algorithms, and Netw., IEEE 2008, pp. 19-24.*

(Continued)

*Primary Examiner* — Kakali Chaki
*Assistant Examiner* — Vincent Gonzales
(74) *Attorney, Agent, or Firm* — James J. DeCarlo; Greenberg Traurig, LLP

(57) ABSTRACT

A system and method for precaching information on a mobile device. A precaching strategy is built for a mobile device The strategy defines a forecast of data types a user is predicted to request after the occurrence of one or more data refresh conditions. The precaching strategy is built by recognizing data usage patterns in data requested by the user or a group of users over a time period. The data usage pattern comprises data types and events that are correlated to the usage of the data. The events are used to define at least one refresh condition within the precaching strategy. The precaching strategy is executed. When the occurrence of the data refresh condition is detected, data is then retrieved from a data source, wherein the data is retrieved according to the precaching strategy. The retrieved data is transmitted to a user device cache.

22 Claims, 4 Drawing Sheets

U.S. PATENT DOCUMENTS

| | | |
|---|---|---|
| 6,047,234 A | 4/2000 | Cherveny et al. |
| 6,098,065 A | 8/2000 | Skillen et al. |
| 6,112,181 A | 8/2000 | Shear et al. |
| 6,157,924 A | 12/2000 | Austin |
| 6,169,992 B1 | 1/2001 | Beall et al. |
| 6,212,552 B1 | 4/2001 | Biliris et al. |
| 6,266,667 B1 | 7/2001 | Olsson |
| 6,314,365 B1 | 11/2001 | Smith |
| 6,314,399 B1 | 11/2001 | Deligne et al. |
| 6,324,519 B1 | 11/2001 | Eldering |
| 6,327,590 B1 | 12/2001 | Chidlovskii et al. |
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1 | 5/2003 | Herz et al. |
| 6,601,012 B1 | 7/2003 | Horvitz et al. |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Makar et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,766,422 B2 | 7/2004 | Beyda |
| 6,773,344 B1 | 8/2004 | Gabai et al. |
| 6,781,920 B2 | 8/2004 | Bates et al. |
| 6,785,670 B1 | 8/2004 | Chiang et al. |
| 6,789,073 B1 | 9/2004 | Lunenfeld |
| 6,813,501 B2 | 11/2004 | Kinnunen et al. |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 | 4/2005 | Miller |
| 6,904,160 B2 | 6/2005 | Burgess |
| 6,931,254 B1 | 8/2005 | Egner et al. |
| 6,961,660 B2 | 11/2005 | Underbrink et al. |
| 6,961,731 B2 | 11/2005 | Holbrook |
| 6,985,839 B1 | 1/2006 | Motamedi et al. |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1 | 6/2006 | Eldering |
| 7,065,345 B2 | 6/2006 | Carlton et al. |
| 7,065,483 B2 | 6/2006 | Decary et al. |
| 7,069,308 B2 | 6/2006 | Abrams |
| 7,073,129 B1 | 7/2006 | Robarts et al. |
| 7,110,776 B2 | 9/2006 | Sambin |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,305,445 B2 | 12/2007 | Singh et al. |
| 7,320,025 B1 | 1/2008 | Steinberg et al. |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,496,548 B1 | 2/2009 | Ershov |
| 7,522,995 B2 | 4/2009 | Nortrup |
| 7,529,811 B2 | 5/2009 | Thompson |
| 7,562,122 B2 | 7/2009 | Oliver et al. |
| 7,577,665 B2 | 8/2009 | Rameer et al. |
| 7,584,215 B2 | 9/2009 | Saari et al. |
| 7,624,104 B2 | 11/2009 | Berkhin et al. |
| 7,624,146 B1 | 11/2009 | Brogne et al. |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,725,492 B2 | 5/2010 | Sittig et al. |
| 7,729,901 B2 | 6/2010 | Richardson-Bunbury et al. |
| 7,769,740 B2 | 8/2010 | Martinez et al. |
| 7,769,745 B2 | 8/2010 | Naaman |
| 7,783,622 B1 | 8/2010 | Vandermolen et al. |
| 7,792,040 B2 | 9/2010 | Nair et al. |
| 7,802,724 B1 | 9/2010 | Nohr |
| 7,822,871 B2 | 10/2010 | Stolorz et al. |
| 7,831,586 B2 | 11/2010 | Reitter et al. |
| 7,865,308 B2 | 1/2011 | Athsani |
| 7,925,708 B2 | 4/2011 | Davis et al. |
| 2001/0013009 A1 | 8/2001 | Greening et al. |
| 2001/0035880 A1 | 11/2001 | Musatov et al. |
| 2001/0047384 A1 | 11/2001 | Croy |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052785 A1 | 5/2002 | Tenenbaum |
| 2002/0052786 A1 | 5/2002 | Kim et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0099695 A1 | 7/2002 | Abajian et al. |
| 2002/0103870 A1 | 8/2002 | Shouji |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |
| 2002/0169840 A1 | 11/2002 | Sheldon et al. |
| 2002/0173971 A1 | 11/2002 | Stirpe et al. |
| 2002/0178161 A1 | 11/2002 | Brezin et al. |
| 2002/0198786 A1 | 12/2002 | Tripp et al. |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1 | 2/2003 | Hutcheson et al. |
| 2003/0033331 A1 | 2/2003 | Sena et al. |
| 2003/0033394 A1 | 2/2003 | Stine et al. |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 | 7/2003 | Jhanji |
| 2003/0149574 A1 | 8/2003 | Rudman |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |
| 2004/0015588 A1 | 1/2004 | Cotte |
| 2004/0030798 A1 | 2/2004 | Andersson et al. |
| 2004/0034752 A1 | 2/2004 | Ohran |
| 2004/0043758 A1 | 3/2004 | Sorvari et al. |
| 2004/0044736 A1 | 3/2004 | Austin-Lane et al. |
| 2004/0070602 A1 | 4/2004 | Kobuya et al. |
| 2004/0139025 A1 | 7/2004 | Coleman |
| 2004/0139047 A1 | 7/2004 | Rechsteiner |
| 2004/0148341 A1 | 7/2004 | Cotte |
| 2004/0152477 A1 | 8/2004 | Wu et al. |
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |

| | | |
|---|---|---|
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan |
| 2005/0149397 A1 | 7/2005 | Morgenstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2005/0278323 A1 | 12/2005 | Horvitz et al. |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0133750 A1 | 6/2008 | Grabarnik et al. |
| 2008/0147655 A1 | 6/2008 | Sinha et al. |
| 2008/0147743 A1 | 6/2008 | Taylor et al. |
| 2008/0148175 A1 | 6/2008 | Naaman et al. |
| 2008/0154720 A1 | 6/2008 | Gounares |
| 2008/0163284 A1 | 7/2008 | Martinez et al. |
| 2008/0172632 A1 | 7/2008 | Stambaugh |
| 2008/0177706 A1 | 7/2008 | Yuen |
| 2008/0270579 A1 | 10/2008 | Herz et al. |
| 2008/0285886 A1 | 11/2008 | Allen |
| 2008/0300250 A1 | 12/2008 | Hardy et al. |
| 2008/0320001 A1 | 12/2008 | Gaddam |
| 2009/0005987 A1 | 1/2009 | Vengroff et al. |
| 2009/0006336 A1 | 1/2009 | Forstall et al. |
| 2009/0012934 A1 | 1/2009 | Yerigan |

| | | | |
|---|---|---|---|
| 2009/0012965 A1 | 1/2009 | Franken | |
| 2009/0043844 A1 | 2/2009 | Zimmet et al. | |
| 2009/0044132 A1 | 2/2009 | Combel et al. | |
| 2009/0063254 A1 | 3/2009 | Paul et al. | |
| 2009/0070186 A1 | 3/2009 | Buiten et al. | |
| 2009/0073191 A1 | 3/2009 | Smith et al. | |
| 2009/0076889 A1 | 3/2009 | Jhanji | |
| 2009/0100052 A1 | 4/2009 | Stern et al. | |
| 2009/0106356 A1 | 4/2009 | Brase et al. | |
| 2009/0125517 A1 | 5/2009 | Krishnaswamy et al. | |
| 2009/0132941 A1 | 5/2009 | Pilskalns et al. | |
| 2009/0144141 A1 | 6/2009 | Dominowska et al. | |
| 2009/0150501 A1 | 6/2009 | Davis et al. | |
| 2009/0150507 A1 | 6/2009 | Davis et al. | |
| 2009/0165051 A1 | 6/2009 | Armaly | |
| 2009/0171939 A1 | 7/2009 | Athsani et al. | |
| 2009/0177603 A1 | 7/2009 | Honisch | |
| 2009/0187637 A1 | 7/2009 | Wu et al. | |
| 2009/0204484 A1 | 8/2009 | Johnson | |
| 2009/0204672 A1 | 8/2009 | Jetha et al. | |
| 2009/0204676 A1 | 8/2009 | Parkinson et al. | |
| 2009/0216606 A1 | 8/2009 | Coffman et al. | |
| 2009/0222302 A1 | 9/2009 | Higgins | |
| 2009/0222303 A1 | 9/2009 | Higgins | |
| 2009/0234814 A1 | 9/2009 | Boerries et al. | |
| 2009/0234909 A1 | 9/2009 | Strandeil et al. | |
| 2009/0249482 A1 | 10/2009 | Sarathy | |
| 2009/0265431 A1 | 10/2009 | Janie et al. | |
| 2009/0281997 A1 | 11/2009 | Jain | |
| 2009/0299837 A1 | 12/2009 | Steelberg et al. | |
| 2009/0313546 A1 | 12/2009 | Katpelly et al. | |
| 2009/0320047 A1 | 12/2009 | Khan et al. | |
| 2009/0323519 A1 | 12/2009 | Pun | |
| 2009/0328087 A1 | 12/2009 | Higgins et al. | |
| 2010/0002635 A1 | 1/2010 | Eklund | |
| 2010/0014444 A1 | 1/2010 | Ghanadan et al. | |
| 2010/0063993 A1 | 3/2010 | Higgins et al. | |
| 2010/0070368 A1 | 3/2010 | Choi et al. | |
| 2010/0118025 A1 | 5/2010 | Smith et al. | |
| 2010/0125563 A1 | 5/2010 | Nair et al. | |
| 2010/0125569 A1 | 5/2010 | Nair et al. | |
| 2010/0125604 A1 | 5/2010 | Martinez et al. | |
| 2010/0125605 A1 | 5/2010 | Nair et al. | |
| 2010/0185642 A1 | 7/2010 | Higgins et al. | |
| 2011/0213800 A1* | 9/2011 | Saros et al. | 707/769 |

FOREIGN PATENT DOCUMENTS

| | | |
|---|---|---|
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2006133344 | 12/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

P. Doshi et al., "A Strategy Selection Framework for Adaptive Prefetching in Data Visualization", Proc. 15th Int'l Conf. on Scientific and Stat. Database Mgmt., IEEE 2003, pp. 1-10.*
M.J. O'Grady et al., "Distributed network intelligence: A prerequisite for adaptive and personalized service delivery", Inf. Syst. Front. 11 (2009) pp. 61-73 (published online Sep. 3, 2008).*
U.S. Appl. No. 11/593,668, filed Nov. 6, 2006 for Naaman, et al.
U.S. Appl. No. 11/593,869, filed Nov. 6, 2006 for Naaman, et al.
"Gutenkarte" Book Catalog, 2006 MetaCarta, Inc., www.gutenkarte.org 11pgs.
Baron, N.S. et al. (Aug. 30, 2005). "Tethered or Mobile? Use of Away Messages in Instant Messaging by American College Students," Chapter 20.1 in Mobile Communication, Springer: London, England, 31:293-297.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/>, last visited on Feb. 2, 2010, thirteen pages.
Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h> . . . , last visited on Feb. 2, 2010, ten pages.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p...,> last visited on Feb. 2, 2010, seventeen pages.
Wooldridge, M. et al. (2005). "Stalk. The Camera-phone Scavenger Hunt!" located at <http://www.stalk.com >, last visited on Dec. 28, 2009, two pages.
www.stalk.com (retrieved on Dec. 29, 2009) pp. 1-2.
Anonymous. (Date Unknown). "CommunityWalk—About," located at <http://www.communitywalk.com/about >, last visited on Mar. 3, 2008, one page.
Anonymous. (Date Unknown). "CommunityWalk Mapping Made Easy," located at <http://www.communitywalk.com/>, last visited on Mar. 3, 2008, one page.
Anonymous. (Date Unknown). "Google Earth User Guide" located at <http://earth.google.com/userguide/v4/>, last visited on Feb. 27, 2008, twelve pages.
Anonymous. (Date Unknown). "Google Earth—Wikipedia, the Free Encyclopedia," located at <http://en.wikipedia.org/wiki/Google_earth >, last visited on Mar. 3, 2008, fourteen pages.
Anonymous. (Date Unknown). "Google Earth User Guide—Using Image Overlays and 3D Models," located at <http://earth.google.com/userguide/v4/ug_imageoverlays.html >, nine pages.
Anonymous. (Date Unknown). "Google Maps," located at <http://en.wikipedia.org/wiki/Google_maps >, lasted visited on Feb. 27, 2008, eleven pages.
Anonymous. (Date Unknown). "Live Search Maps," located at <http://en.wikipedia.org/wiki/Windowns_live_maps >, last visited on Mar. 3, 2008, six pages.
Anonymous. (Date Unknown). "WikiMapia," located at <http://en.wikipedia.org/wiki/WikiMapia >, last visited on Mar. 3, 2008, three pages.
Anonymous. (2007). "Ask.com Maps & Directions," located at <http://maps.ask.com/maps >, last visited on Mar. 3, 2008, one page.
Anonymous. (2007). "Wayfaring Follow You, Follow Me," located at <http://www.wayfaring.com/>, last visited on Mar. 3, 2008, three pages.
Anonymous. (2008). "Platial the People's Atlas," located at <www.platial.com >, last visited on Mar. 3, 2008, one page.
Anonymous. (2008). "Wikimpaia.org ," located at <http://wikimpaia.org/>, last visited Mar. 3, 2008, one page.
U.S. Appl. No. 12/273,259, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/952,007, filed Dec. 6, 2007, Davis.
U.S. Appl. No. 11/953,454, filed Dec. 10, 2007, Davis.
U.S. Appl. No. 11/953,494, filed Dec. 10, 2007, Davis.
U.S. Appl. No. 12/059,594, filed Mar. 31, 2008, Martinez.
U.S. Appl. No. 12/236,668, filed Sep. 24, 2008, Davis.
U.S. Appl. No. 12/057,943, filed Mar. 28, 2008, Martinez.
U.S. Appl. No. 12/057,878, filed Mar. 28, 2008, Martinez.
U.S. Appl. No. 11/969,751, filed Jan. 4, 2008, Martinez.
U.S. Appl. No. 12/163,249, filed Jun. 27, 2008, Kalaboukis.
U.S. Appl. No. 12/145,145, filed Jun. 24, 2008, Davis.
U.S. Appl. No. 12/182,813, filed Jul. 30, 2008, Higgins.
U.S. Appl. No. 12/182,969, filed Jun. 27, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.

U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,317, filed Nov. 18, 2008, Nair.
U.S. Appl. No. 12/273,345, filed Nov. 18, 2008, Nair.
U.S. Appl. No. 12/273,371, filed Nov. 18, 2008, Nair.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 12, 2008, Churchill.
U.S. Appl. No. 12/242,656, filed Sep. 30, 2008, Burgener.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins,
U.S. Appl. No. 12/357,285, filed Jan. 21, 2009, Higgins.
Axup, Jeff et al., "Conceptualizing New Mobile Devices by Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49, (Abstract only attached).
Konomi, Shin'ichi et al., "Supporting Colocated Interactions Using RFID and Social Network Displays", Pervasive Computing, Jul.-Sep. 2006, vol. 5, No. 3, pp. 48-56 (pp. 1-4 of attached).
Lin, F. et al., "A unified framework for managing Web-based services.", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).
Voight, Joan et al., "Lessons for Today's Digital Market", ADWEEKCOM, Oct. 2, 2006, pp. 1-6.
"Companies add new communication features to photo sharing.", Digital Imaging Digest, Feb. 2006, pp. 1-2.
"DAVE.TV and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, No. 420, p. 305, Sep. 2006, (pp. 1-9 of attached).
"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.
Nedos, A; Singh K., Clarke S, "Proximity Based Group Communications for Mobile AD HOC Networks", Proximity-Based Group Communication; Global Smart Spaces; D.14; Oct. 3, 2003; 31 pages.
Brunato, M; Battiti R. "Pilgrim: A Location Broker and Mobility-Aware Recommendation System"; Technical report DIT-02-0092, Universita di Trento, Oct. 2002; 8 pages.
Backstrom et al., Spatial Variation in Search Engine Queries, WWW•2008, Beijing, China (Apr. 21-25, 2008).
Gan et al., Analysis of Geographic Queries in a Search Engine Log, LocWeb 2008, Beijing, China (Apr. 22, 2008).

Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).
International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.
U.S. Appl. No. 12/241,590, filed Sep. 30, 2008, Athsani.
U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.
U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.

U.S. Appl. No. 11/593,869, filed Nov. 6, 2006, Mor Naaman.
U.S. Appl. No. 11/593,668, filed Nov. 6, 2006, Mor Naaman.
Allen James F., "Maintaining Knowledge About Temporal Intervals", Communications of the ACM, Nov. 1983, vol. 26, No. 11 pp. 832-843; 12 pages.
Press Release, "Qualcomm Conducts First Live Demonstration of FL Technology on a Wireless Handset", Qualcomm Inc., San Diego, Sep. 27, 2005; 3 pages.
MediaFlo, FLO Technology Overview, Qualcomm Inc. Copyright 2007; 24 pages.
Notification of Transmittal of The International Search Report and The Written Opinion of The International Search Authority, Or Declaration (PCT/US2007/'084797) dated Mar. 21, 2008; 11 pages.
International Search Report (PCT/US2007/084807) dated May 27, 2008; 3 pages.
International Preliminary Report on Patentability (PCT/US2007/084807) dated May 26, 2009; 5 pages.
International Search Report (PCT/US2010/026063) dated May 27, 2008; 3 pages.
Rekimoto, et al., "CyberCode: designing augmented reality environments with visual tags." Proceedings of DARE 2000 on Designing augmented reality environments, Elsinore, Denmark, pp. 1-11 Apr. 12-14, 2000.
"Semacode-URL Barcodes-practical ubiquitous computing", located at http://semacode.org visited on Apr. 13, 2007; 3 pages.
"Technical White Paper: Choosing the best 2D barcode format for mobile apps," Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.
Davis, M. et al. "From Context to Content: Leveraging Context for Mobile Media Metadata." 9 pages.
Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Davis, M. et al. "Using Context and Similarity for Face and Location Identification."10 pages.
Flickr. Welcome to Flickr—Photo Sharing, located at <http://www.flickr.com > visited on Feb. 26, 2007, one page.
Gargi, U. (Aug. 7, 2003). "Consumer Media Capture: Time-Based Analysis and Event Clustering," Technical Report HP-2003-165 HP Laboratories Palo Alto, pp. 1-15.
Goldberger, J. et al. The Hungarian Clustering Method, located at <http://scholar.googles.com/scholar?num=20&h1=en&lr=&9=cache:vbwslsm1CisJ:www.openu.acil/Personal_sites/tarnirtassa/Publications/hcm.pdf+goldberger+clustering+method+hungarian> visited on Mar. 1, 2007, twelve pages.
Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.
Joshi, D. et al. (Oct. 15-16, 2004). "The Story Picturing Engine: Finding Elite Images to Illustrate a Story Using Miitual Reinforcement," MIR '04 New York, New York. 9 pages.
Naaman, M. et al. (Nov. 2003). "From Where to What: Metadata Sharing for Digital Photographs with Geographic Coordinates," In On the Move to Meaningul Internet Systems 2003: Coop/S, DOA, and ODBASE R. Meersman et al., pp. 196-217.
Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.
Nair, R. et al. (Nov. 6-11, 2005). "Photo L01: Browsing Multi-User Photo Collections," MM'05 Singapore, pp. 223-224.
O'Hare, N. et al. "Combination of Content Analysis and Context Features for Digital Photograph Retrieval." 7 pages.
Pigeau, A. et al. (Jun. 17, 2005). "Organizing a Personal Image Collection with Statistical Model-Based ICL Clustering on Spatio-Temporal Camera Phone Meta-Data." 25 pages.
Sarves, R. et al. (Jun. 6-9, 2004). "Metadata Creation System for Mobile Images," MobiSys'04 Boiton, Massachusetts, pp. 36-48.
Toyama, K. et al. (Nov. 2-8, 2003). "Geographic Location Tags on Digital Images," MM'03 Berkeley: California. 12 pages.
Almieda, R.B. et al. "A Community-Aware Search Engine," WWW2004, New York., NY, May 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.
Anonymous. (Jul. 17, 2006). "Fantasy Football Lineup Analyzer— Tips for Who to Start & Who to Bench each Week," located at http://web.archive.org/web/200607171633529/www.fantasyfootballstarters.com/lineupAnalyzer.jsp>, last visited on Feb. 10, 2009, one page.
Bharat, K. (Date Unknown). "SearchPad: Explicit Capture of Search Context to Support Web Search," located at <http://www9.org/w9cdrom/173/173.html >, last visited Aug. 1, 2007, 13 pages
Budzik, J. et al. (2000). "User Interactions with Everyday Applications as Context for Just-in-Time Information Access," Proceeding of the 2000 Conference on Intelligent User Interfaces, eight pages.
Finkelstein, L. et al. (2001). "Placing Search in Context: The Concept Revisited," WWW/O, Hong Kong, May 2-5, 2001, pp. 406-414.
Freyne, J. et al. (2004). "Further Experiments on Collaborative Ranking in Community-Based Web Search," Artificial Intelligence Review, pp. 1-23.
Lieberman, H. (1995) "Letizia: An Agent that Assists Web Browsing," Proceedings of the Fourteenth International Joint Conference on Artificial Intelligence, Aug. 20-25, 1995, six pages.
Mitra, M. et al. (1998). "Improving Automatic Query Expansion," Proceedings of the AMC SIGIR, nine pages.
Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent...>, last visited Aug. 1, 2007, six pages.
Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.
Yahoo! Inc. (Dec. 7, 2005). "Yahoo! Widget Engine 3.0 Reference Manual Version 3.0," 300 pages.
U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.
Written Opinion PCT/US2008/088228 dated Sep. 30, 2009—5 pages.
International Search Report (PCT/US2010/043780) dated Mar. 25, 2011; 3 pages.

* cited by examiner

SYSTEM AND METHOD FOR PRECACHING INFORMATION ON A MOBILE DEVICE

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for information search, retrieval and presentation and, more particularly, to systems and methods for precaching information on user devices.

BACKGROUND OF THE INVENTION

Users of mobile devices can access a rich array of content over the Internet including spatial, temporal, social and topical data relating to an almost unlimited number of entities and objects. Accessing such data can, however, consume a significant amount of computing and network resources. Device and network performance can be enhanced by precaching information a user is likely to request on the user's device or elsewhere on the network.

SUMMARY OF THE INVENTION

In one embodiment, the invention is a method. A precaching strategy is built, using at least one computing device, for a mobile device, wherein the precaching strategy defines a forecast of at least one data type a user is predicted to request after the occurrence of at least one data refresh condition. The precaching strategy is built by recognizing, using the at least one computing device, at least one data usage pattern in data requested by the user using the user device over a time period. The data usage pattern comprises the data type and at least one event that is correlated to the usage of the data. The event is used to define at least one refresh condition within the precaching strategy. The precaching strategy is executed using the computing device. The occurrence of the data refresh condition is detected. Data is then retrieved, over a network, from the data source, wherein the retrieved data is retrieved according to the precaching strategy. The retrieved data is transmitted, over the network, to a user device cache accessible to at least one application program running on the user device.

In another embodiment, the invention is a method. A precaching strategy is built, using at least one computing device, for a mobile device, wherein the precaching strategy defines a forecast of at least one data type a user is predicted to request after the occurrence of at least one data refresh condition. The precaching strategy is built by recognizing, using the computing device, at least one data usage pattern in data requested by a plurality of users over a time period, wherein the data usage pattern comprises the data types. The precaching strategy is executed using the computing device. The occurrence of the data refresh condition is detected. Data is then retrieved, over a network, from the data source, wherein the retrieved data is retrieved according to the precaching strategy. The retrieved data is transmitted, over the network, to a user device cache accessible to at least one application program running on the user device.

In another embodiment, the invention is a system. The system comprises a set of modules, wherein each of the modules comprise one or more processors programmed to execute software code retrieved from a computer readable storage medium storing software for various functions. The modules include: a precaching strategy creation module for building precaching strategies for mobile devices, wherein the precaching strategy defines a forecast of at least one data type a user is predicted to request after the occurrence of at least one data refresh condition, wherein the precaching strategy is built by recognizing at least one data usage pattern in data requested by a plurality of users over a time period, wherein the data usage pattern comprises the data types; a precaching strategy execution module for executing precaching strategies built by the precaching strategy creation module; a refresh condition detection module for detecting that data refresh conditions have occurred relating to precaching strategies executed by the precaching strategy execution module; a data retrieval module for retrieving data, over a network, from at least one data source, wherein the retrieved data is retrieved according to precaching strategies for data where the refresh condition detection module has detected that data refresh conditions have occurred; and a data transmission module for transmitting data retrieved by the data retrieval module the retrieved data, over the network, to user device caches accessible to application programs running on the user devices.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
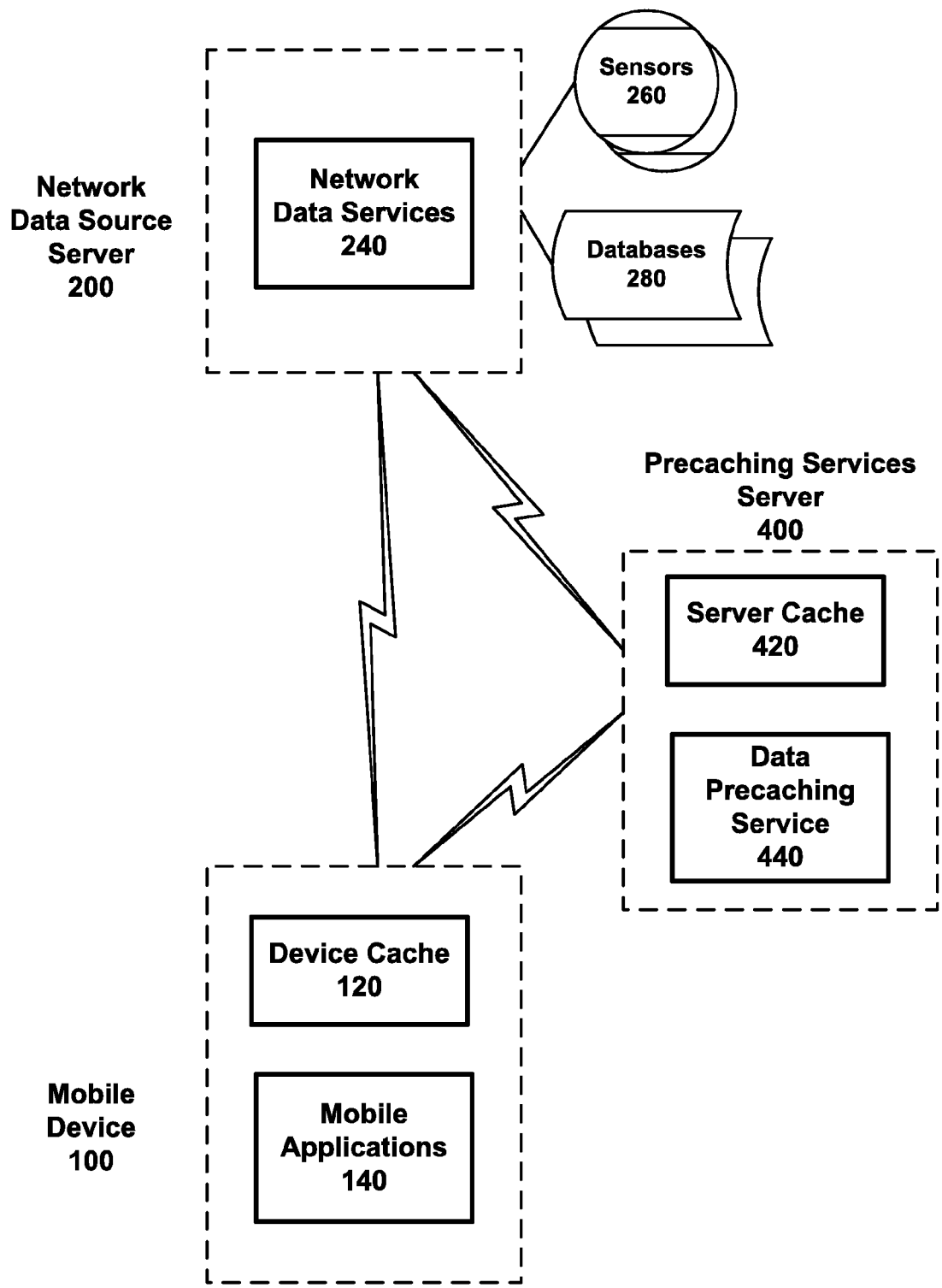
FIG. 1 illustrates one embodiment of how precaching could be utilized on for mobile devices to improve device performance.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

For the purposes of this disclosure the term "server" should be understood to refer to a service point which provides processing, database, and communication facilities. By way of example, and not limitation, the term "server" can refer to a single, physical processor with associated communications and/or data storage and/or database facilities, or it can refer to a networked or clustered complex of processors and associated network and/or storage devices, as well as operating software and one or more database systems and/or applications software systems (which can be implemented as modules and/or engines) which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

In one embodiment, the present invention is directed to a improvements in precaching information a user of a mobile device is likely to request on the user's mobile device or elsewhere on a network accessible to the mobile device.

Mobile device's such as Blackberry and iPhone devices provide rich graphical interfaces that are capable of displaying a broad variety of information retrieved from the Internet and/or other networks accessible to the device. Such information can be broadly categorized as temporal, spatial, topical and social information. Spatial information includes information relating to the physical location of persons or objects. Spatial information can include the past, present and future location of the user of the mobile device or the location of other persons, such as the user's friends. Spatial information could also be specific place, such as a country, a state, a city, a neighborhood. Spatial information could be the location of an event, such as a concert or some other newsworthy occurrence.

Temporal information includes dates and times of interest to the user. Temporal information could include the current date and time. Temporal information could also be a specific date and time in the past or the future, or a range of dates and times in the past or the future. Temporal information could be an offset from a specific date, for example, ten days in the past. Temporal information could be an event on a calendar, such as a birthday, a season or a holiday.

Topical information includes any type of information on topics of interest to the user. Topical information could include the current weather or weather forecast, current headlines, or current scores for a favorite sports team. Topics could be broad, such as "rock music" or narrow such as a specific musical artist. Topics could relate to specific types of media, for example, new songs released by a musical artist, or text news articles about the same musical artist.

Social information includes any type of information relating to persons or groups of persons of interest to the user. Such information could include information relating to friends or contacts the user has identified on one or more social networks. Such information could include contact information for the user's friends. Such information could also include friends current location, activities or latest posts to friend's MySpace or Twitter accounts.

Much of the information displayed on a user's mobile device is typically retrieved from various data sources available over the Internet, such as websites and various types of data feeds such as RSS feeds. A small amount of relatively static information can be permanently stored on the mobile device, such as profile information, but any potentially volatile information must be at least periodically retrieved from one or more data sources over the network. In one embodiment, such information is cached on a computer readable medium within or physically connected to the user's mobile device such as, for example, random access memory within the mobile device.

Data in cache is readily accessible for display, whereas, if data is retrieved over the network only when requested by the user, network delays or processing limitations at data sources can cause response time to be impaired. In one embodiment, the performance of a mobile device can be improved by precaching information the user is likely to request, either on the user's mobile device, or elsewhere on a network to which the mobile device is connected.

FIG. 1 illustrates one embodiment of how precaching could be utilized on for mobile devices to improve device performance.

User's mobile devices 100 host one or more mobile applications 140 that utilize data from one or more data source services 240, such as weather, news or social networking websites or data feeds. Such applications 140 could include a conventional web browser, or could include custom applications. The mobile application typically looks for data that is displayed by the application in one or more caches 120 on the device. Such a cache could be stored on, for example, a computer readable media such as random access memory that is a component of the mobile device 100.

If the data needed by the mobile application 120 is not stored in the device's cache 140, the mobile application will request the needed data, over a network, from the appropriate network data source 240 implemented one or more network data source servers 200 which retrieve the requested information from one or more data sources such as, for example, databases 280 or sensors 260. The data retrieval service 240 will, in turn, transmit the data back to the requesting mobile device 200 which will typically store the information in its cache 120 before displaying the data to the user.

Performance of the mobile applications 140 could be improved if the user's data needs could be anticipated before the user requests display of the data. If the user's data needs could be anticipated, data sufficient to satisfy the user's needs could be retrieved from the appropriate source 200 and transmitted and stored in the mobile device's cache 120. For any given network data source 200, the user's data needs could be anticipated by the mobile application, and the mobile application could request the needed data before the user actually requests display of the data. For any given network data source 200, the user's data needs could be anticipated by the network data source and the network data source could transmit the needed data to the users mobile device 100 before the user actually requests display of the data.

A third alternative, a data precaching service 440 could be set up on one or more data precaching servers 400. The data precaching service 440 could anticipate the user's data needs and request data from the appropriate data source 200. In one embodiment, the data caching service 440 can direct the data source 200 to transmit the requested data directly to the mobile device 100, which then stores the data in its cache for future use. Alternatively, the requested data could be transmitted to the data caching service server 400.

In one such embodiment, the data caching service 440 could then simply forward the data to the user's mobile device 100. Alternatively, the data precaching service 440 could store the requested data in a server cache 420 implemented on computer readable media accessible to the data precaching server 400, such as, for example, the server's RAM. In one such embodiment, the mobile device 100 could request all data required by the mobile applications 140 from the data precaching service 440, which in turn retrieves the data from the server cache 420, if the data is present there, or directly from the appropriate data source 200 if not. The data caching service 440 could also transmit the requested data to the mobile device 100 periodically, or based on a trigger, such as the occurrence of an event or the lapse of a period of time.

One benefit of caching data at the level of the data caching server 400 is that it may be possible to cache one copy of a particular type of data for multiple users. For example, many users may be interested in the tomorrow's weather forecast for a specific zip code. Thus one copy of such weather data could be maintained on the caching server 400 for user by hundreds of users. At a higher level of abstraction, users, based on their pattern of data usage or on the basis of the their self defined data needs, could be assigned to one or more user types. Such a user type could be associated with one or more sets of data which the data caching service 440 maintains in server cache 420.

The central element in any of the embodiments discussed above is anticipating a user's future data needs. If a user's future data needs can be determined, or at least forecast with a reasonable degree of accuracy, a data caching strategy could be constructed for a mobile device user. In one embodiment, a data precaching strategy could be schematically represented as follows.

```
<user> or <user type>
    <device ID> or <device type>
        <data type >
            <data source>
                <request parameters>
```

```
                    <refresh condition 1>
                    <refresh condition 2>
                    ...
                <data type >
                ...
                <data type >
                ...
```

A data precaching strategy could be set up for a specific user. If a user has multiple devices, a precaching strategy could be set up for each of the user's devices, since the user may use different devices for distinctly different purposes. A data caching strategy could also be set up for a type of user. Such user types could reflect typical usage patterns for general types of users, e.g. "NY Commuter", or even more abstractly "User Type n" for an empirically recognized usage pattern (e.g. user is a frequent user of data types A, B and C).

A data precaching strategy can contain one or more data types. As used herein, "data type" should be understood to refer to an abstract user defined data type that could refer to spatial, temporal, social or topical data. Examples of spatial data types could include the user's current location, the user's friends locations, the location of the user's favorite sports team. Examples of temporal data types could include the current time, the next event on the user's calendar, or the time of the next classical music concert in town. Examples of social data could be a list of the user's friends, posts by the user's friends on social networking sites, a list of the last concert the user's friends attended and so forth. Examples of topical data could include general news, news on specific topics, weather forecasts, current traffic, sports scores and so forth.

For a given data type, there could be one or more data sources, which could include websites, RSS feeds, FTP sites or any other type of data source. The data strategy could include request parameters required for requesting the desired information from the data source (e.g. URL parameters).

Each data type could provide for one or more refresh conditions. Refresh conditions represent conditions under which precached data is refreshed from the data source. In one embodiment, refresh conditions can reflect temporal, spatial, social or topical events or conditions. Spatial events could include any events where there is a change in spatial data associated with the user or an entity of interest to the user. For example, a spatial event a change in the user's physical location of a particular magnitude (e.g. 1 mile, or entering another city), or the user coming within a defined proximity of a location (e.g. a specific coffee shop, or the user's work location) or within a defined proximity of a person (e.g. a friend).

Temporal events could include any events associated with the passage of time. For example, temporal events could include, for example, the lapse of a specific time interval (e.g. five minutes or a recurring, absolute time, such as 12:00 PM every day), or a specific calendared event (e.g. a birthday, or dates and times that a favorite sports team is playing). Social events could include could include any events associated with the user's social network. For example, social events could include emails sent by friends or new posts, including text or images, by friends on social networking sites. Topical events could include any events associated with a topic such news flashes, updated sports scores, weather alerts, or new songs available from a favorite musical artist.

Refresh conditions could reflect compound conditions including multiple events or conditions of different types. For example, sports scores might be refreshed every one minute, but only during the times a favorite sports tem is scheduled to play. Traffic conditions may only be refreshed during rush hours or if there is a reported accident. Data relating to friends, such as recent posts, messages and/or images may only be refreshed off business hours Note that the data caching strategy as discussed above is exemplary, and is not intended to be limiting. The strategy could include other elements not discussed above, and/or could be represented in different formats. All such embodiments are intended to be within the scope of this disclosure.

Data caching strategies similar to those discussed above could be implemented by a data precaching service running on a data precaching server. The precaching strategies could be stored on a computer-readable medium accessible to the data precaching server. The strategies could be stored in any suitable format such as human readable formats such as XML, or could be stored in a proprietary binary format.

There are a number of methods for defining data precaching strategies, which could, in some embodiments, be used alone or in combination with one another. In one embodiment, a user could explicitly define the types of data to precache on the user's device. For example, a user, using a mobile application, could explicitly specify they wish to have football scores derived from a sports website updated every one minute on Sundays during football season. Users could specify they wish to have traffic conditions updated every five minutes during rush hour.

In one embodiment, a user could implicitly define the types of data to precache on the user's device. For example, if a user customizes their homepage for their mobile device, they may select a variety of spatial, temporal, topical or social data to display on the page. The act of selecting a specific type of data for display on the page could automatically add one or more associated data types to the precaching strategy. Refresh conditions could initially be based on global default refresh conditions, such as, for example, a rule to refresh the data every five minutes. Default refresh conditions could also be established for different data types, for example, weather forecasts may be refreshed hourly, whereas news headlines may be refreshed every five minutes.

On the opposite end of the spectrum, data caching strategies could be defined entirely on usage. For example, data retrieved by mobile applications on a user's device could be analyzed over a period of time, for example, a day, a week or a month. Data types and their corresponding sources could be identified. More complex analysis could be conducted, and various patterns of data usage could be identified. Patterns could reflect spatial, temporal, social or topical correlations. For example, spatial patterns could indicate a user retrieves traffic information when located on a specific highway. Temporal patterns could indicate that a user retrieves football scores between 12:00 PM and 8:00 PM on Sundays. Social patterns could indicate that user retrieves data from relating to specific individuals. Topical patterns may indicate a user retrieves headline news or sports scores. In one embodiment, such patterns could involve multiple variables and complex patterns.

In particular, data relating to data usage patterns could be obtained from a user's social networks. In one embodiment, the user's global social graph can be determined by analyzing every known social network in which the user participates. Instead of, or in addition to, analyzing a user's usage data, all or a portion of usage data relating to a user's global social graph could be analyzed as well. In one embodiment, usage data relating to all persons on a user's social graph could be analyzed for usage patterns, or a fraction of the user's social graph, for example persons the user defined as friends could be analyzed. The most important persons within a user's social network could be analyzed. The most important persons could be identified by, for example, the frequency of contacts between the user and the person.

User defined and empirical data based generation of user data caching strategies could be utilized. For example, a data caching strategy could be implicitly defined when a user sets up a home page for mobile device, and the strategy could be dynamically altered based on data usage patterns. In one embodiment, data usage patterns in a user's data usage are identified. For example, data usage patterns may indicate a user checks headline news every 10 minutes every day between 8:00 AM and 9:00 AM. Thus, if a user places news headlines on his or her homepage, a default caching strategy could be to refresh the cache for headline news every hour, usage patterns could indicate the cache should be refreshed more frequently between 8:00 and 9:00 AM.

If a cache refresh rate is based on usage, the refresh rate can be optimized such that statistically it is likely that the data the user is likely to be interested in will be in cache some fixed percentage of the time. For example, the cache can be refreshed such that it is 90% likely that when a use requests information, the information will be available in cache.

There are other, additional, methodologies that could be used to determine data precaching strategies. One methodology that could be used is to define usage patterns for data types. In one embodiment, data types could be defined in a hierarchy of types and an unlimited hierarchy of sub-types. Such a hierarchy could be conceptually represented as:

```
<data type>
    <sub-type>
        <sub-sub-type>
        ...
    <sub-type>
...
<data type>
...
```

One example could be, for example:

```
<sports>
    <team scores>
        <yankees-scores>
        ...
    <red sox scores>
    ...
```

At each level of the data hierarchy, there could be specific usage patterns. Users interested in sports data may, in general, exhibit specific data usage patterns, such as checking sports news daily every hour. Yankees fans may check scores every 10 minutes on dates and time that Yankees games are taking place. Usage patterns could be used to developed caching strategies for each type, sub-type and so forth. Alternatively or additionally, an administrator or other user could set up data types and set up caching strategies. Caching strategies could be dynamically determined for each type and sub type based on usage patterns on a periodic basis, for example, weekly or monthly.

In one embodiment, usage patterns for a specific data type could be determined for a specific user (as discussed above), a specific social circle defined by a group of users who include one another in their social circle or could be all users or a subset of known users having one or more specific properties (e.g. Yankees fans). Usage patterns could be determined by analyzing actual usage patterns for a defined set of users over a defined period, such as a day, a month or a year. Such usage patterns could be used to develop data precaching strategies.

Data type hierarchies could be defined by an administrator, and default caching strategies could be, initially, defined manually. Such caching strategies could be dynamically altered using data usage patterns from all users or some subset of all users. Alternatively or additionally, data usage patterns for data types could be empirically identified by analyzing data usage patterns from all users or some subset of all users. Identified data types could be manually organized or placed in an existing data hierarchy. Alternatively or additionally, data hierarchies could be empirically identified by matching similar patterns of data usage.

If precaching strategies are determined for specific data types, such precaching strategies can be used to determine precaching strategies using other methodologies discussed herein. For example, if a user explicitly or implicitly adds a data type to his or her precaching strategy, rather than using the user's actual data usage patterns over some arbitrary period of time, data precaching strategies that have already been developed for data types the user is interested in could be used in the user's precaching strategy. For example, in the case of a user interested in Yankees scores, a precaching strategy for Yankees scores could be developed based on data from all users interested in Yankees scores. Such a strategy could be, in turn, incorporated into the profile of an individual user interested in Yankees scores.

User types could be defined that include precaching strategies for user types. User types can be broadly defined as a group of users that have a specific pattern of data usage. One definition of a user type could be a group of users that use data relating to a specific pattern of data types. Such patterns could be empirically identified, such as, for example, observing that there is a specific correlation between interest in one data type and another data type. Such patterns could be identified by an administrator, for example, an administrator could define a user type such as a football fan, where such a user is interested in data types including football news items and football scores.

User types could simply incorporate data types and inherit usage patterns and caching strategies from incorporated data types. Alternatively, data usage patterns could be analyzed for users identified as belonging to specific user types, and data usage patterns could be determined for the user type as a whole or for data types within the user type. Alternatively, data usage patterns and data precaching strategies could be initially taken from predefined user types and data types and refined by the user's actual usage patterns or the actual usage patterns of a defined group of users such as all users, the users social circle or the user alone.

A user could be assigned to a user type explicitly, implicitly or empirically. A user may self define himself or herself as, for example, a Packer's fan. Alternative, a user could identify himself or herself as a football fan by selecting football news and football scores for inclusion on his or her home page. A user could be empirically assigned to a user type by identifying a pattern of data types and usage frequencies and correlating such patterns to an explicitly or empirically defined user type. In one embodiment, data usage patterns relating to users who are explicitly defined to be of a particular type can be used to train classifiers, such as SVMs to assign new users to particular user types.

In one embodiment, a user can be assigned to more than one user type. Thus, for example, a user may be a "NY Commuter" and a "Yankee Fan". Each type exhibits specific types and data usage patterns. In one embodiment, where user types comprise different data types, user types could be seamlessly combined. Where data types overlap, data usage patterns and precaching strategies could be selected from one user type or be averaged (if they differ).

In one embodiment precaching strategies could be restricted to a specific set of content a user typically accesses. For example, precaching strategies could be limited to elements present on the user homepage for a mobile device. Precaching strategies could be used to personally to model information needs, habits and designate predictive models for the type, frequency and timing of users actual content load and display requests. Such strategies could be used to create an individuated caching profile and thus cache for that user according to that model. Such individuated profiles could be maintained for individual users or types of users.

Thus, precaching can be optimized in at least two ways. First by collaborative filtering of patterns across all known users with the same or similar content and/or habits to establish a set of standard types or classes" of users, or second, individually based exclusively on the actual behaviors of that user or device.

For example, assume a user's calendar has a daily alarm clock at 6 AM regularly on a Monday through Friday basis. A user's profile could include delivery of a refreshed homepage the user's device at 5:59 AM. Individual patterns for every user requires could require significant space and processing, so it is a user's profile could include a one or more types that are close enough to each of user's actual usage data sets. Thus, in one embodiment, a limited number of caching models could be utilized for easier implementation and then match each user could be matched to the to closest possible match.

Thus, each user helps to establish the norms for the configuration choices of types of users. Depending on the content, there can be are different types of users on entities web site with varying concerns. A soft expiration of cached data based upon the aggregate patterns of the users and the actual needs and context of a specific user can be established. Individual caching can provide better user experience and can change over time to grow and improve as more actual usage data is accumulated.

Figure 2:
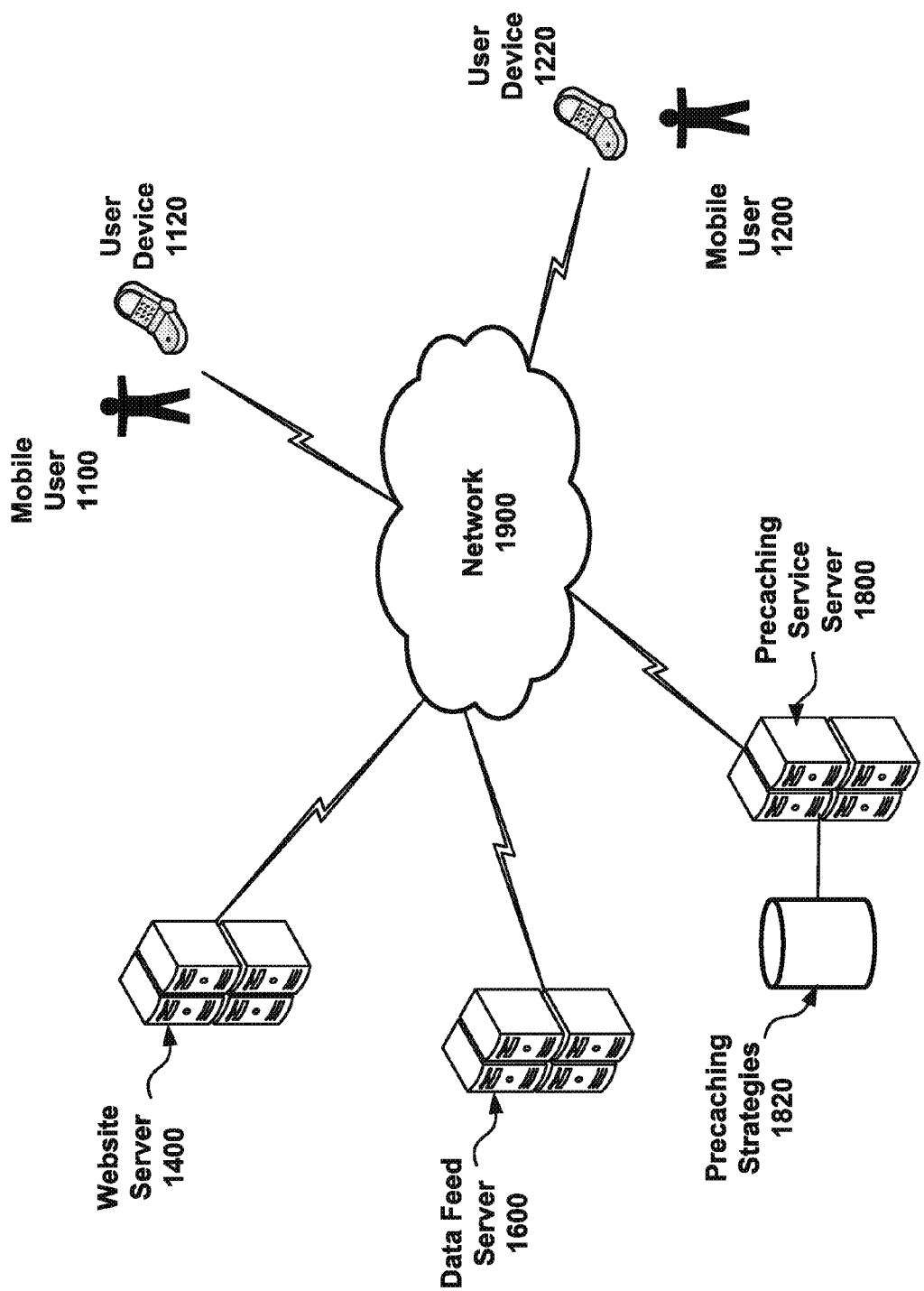
FIG. 2 illustrates one embodiment of a hardware and network configuration that is capable of supporting various embodiment of the current invention.

FIG. 2 illustrates one embodiment of a hardware and network configuration that is capable of supporting various embodiment of the current invention.

One or more users 1100 and 1200 periodically access information using their mobile devices 1120 and 1220 over a network 1900 such as, for example, the Internet. Such information originates with one or more network data providers, such as servers hosting websites 1400, data feeds 1600 or other services that provide information in any conventional format known in the art.

Figure 3:
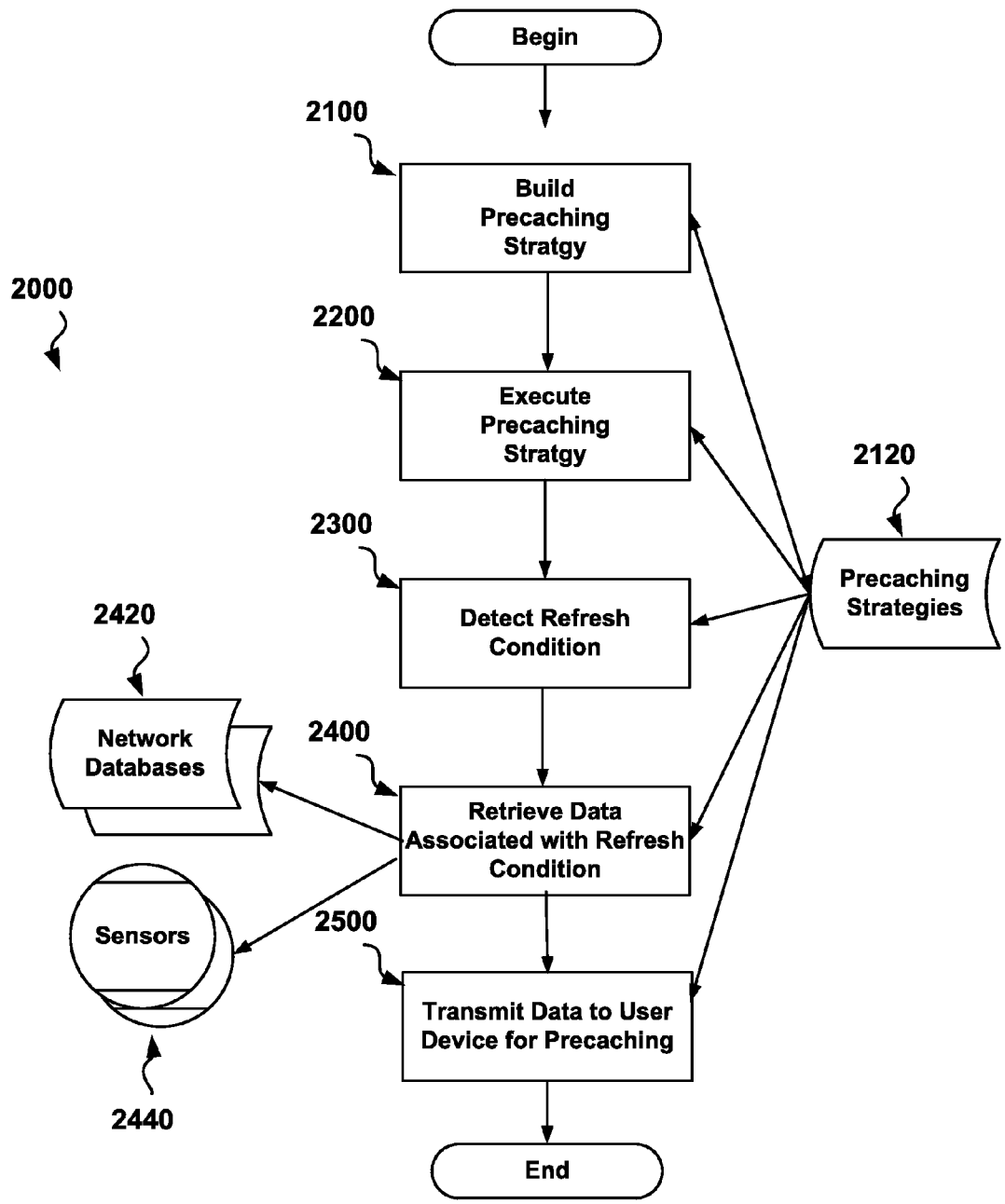
FIG. 3 illustrates one embodiment of a computer implementation of a process implementing at least one embodiment of the current invention.

The mobile device users could obtain information, at least in part, via a data precaching service residing on a precaching service server 1800. The data precaching service could predict users likely data needs in any manner, such as the techniques described above. The service could maintain data precaching strategies on a computer readable medium 1820 and transmit data to users mobile devices 1120 and 1220 in anticipation of the users data needs. The service could analyze, among other things, the users 1100 and 1200 data usage patterns and use such patterns to determine precaching strategies. As described above, precaching strategies could be determined using data from all users or a subset of all users FIG. 3 illustrates one embodiment of a computer implementation of a process 3000 implementing at least one embodiment of the current invention.

A precaching strategy is built 2100, using at least one computing device, for a mobile device, wherein the precaching strategy defines a forecast of at least one data type a user is predicted to request after the occurrence of at least one data refresh condition. In one embodiment, data refresh conditions comprise one or more events, wherein when the events occur, the refresh condition is satisfied. Data types can comprise any kind of spatial, temporal, social or topical data, such as, for example, current location, a calendar event, a friend's latest Facebook posting, news relating to a topic or scores for a favorite sports team. The events within a refresh condition can be any type of spatial, temporal, social or topical event, such as, for example, the user enters a new city, a fixed time interval elapses, a friend makes a new Facebook post or a new news item relating to a topic appears on a newswire. In one embodiment, the precaching strategy is stored on a computer readable medium 2120.

In one embodiment, the precaching strategy is built by recognizing, using the computing device, at least one data usage pattern in data requested by the user using the user device over a time period The data usage pattern can comprises a data type, and can additionally include at least one event that is correlated to the usage of the data. The correlated event can be used is used to define at least one refresh condition within the precaching strategy for that data type.

Such usage data could be obtained from any available source, such as, for example, query logs, data server logs or logs residing on the user device. Usage data could be prospective tracked by a data precaching service for the express purpose of building a precaching strategy.

In addition to analyzing usage data for individual users or user devices, data usage patterns could be recognized in usage data for a group of users. Such groups could include all users, or a selected subset of users. In one embodiment, a group could comprise one or more users selected from a user's social graph.

Data types within a precaching strategy could be determined purely empirically by recognizing data usage patterns within data usage data. Alternatively, or additionally, data types could be predefined. In one embodiment, a hierarchy of data types could be defined manually by an administrator or through the analysis of data usage by one or more users, such as, for example, sports news->scores->baseball scores->Yankees scores. Precaching strategies could then be built for such predefined data types. In one embodiment, precaching strategies for individual data types could built by analyzing large amounts of data for a large number of users. Spatial, temporal, social and topical patterns of data usage and correlated events could be recognized and used to build strategies at every level of a data hierarchy.

Predefined data types could then be used to build precaching strategies for individual users. In one embodiment, if a given data type is recognized in a user's data usage pattern, the predefine caching strategy for that data type could be used in place of using the user's actual usage patterns. Precaching strategies for data types could be selected for a specific data type identified in a user's data usage patterns (e.g. Yankee's scores) or for a more generic data type that encompasses the identified data type (e.g. baseball scores).

Precaching strategies could be built for user types. A specific group of users could be identified using one or more user properties. Such properties could include, without limitation, demographics (e.g. student, 18-22 years old) or a self identified category (e.g. Yankee's fan). In one embodiment, data usage patterns are recognized in data usage data for all or a subset of all users in the identified group. Such patterns could be used to empirically develop data precaching strategies, or could be used to select predefined precaching strategies for predefined data types.

One a precaching strategy is built, it is then executed 2200 by the computing device. In one embodiment, a user's precaching strategy is executed whenever the user's mobile device is connected to the network and continues to execute as long as the user is connected to the network. In one embodiment, the precaching strategy only executes when the user is actively interacting with the mobile device.

Under the control of the precaching strategy, the computing device detects 1300 when data refresh conditions have occurred. When a data refresh condition occurs, the computing device then retrieves 2400 the data associated with the refresh condition from the appropriate data source and transmits the data 2500, over the network, to a user device cache accessible to at least one application program running on the user device.

Figure 4:
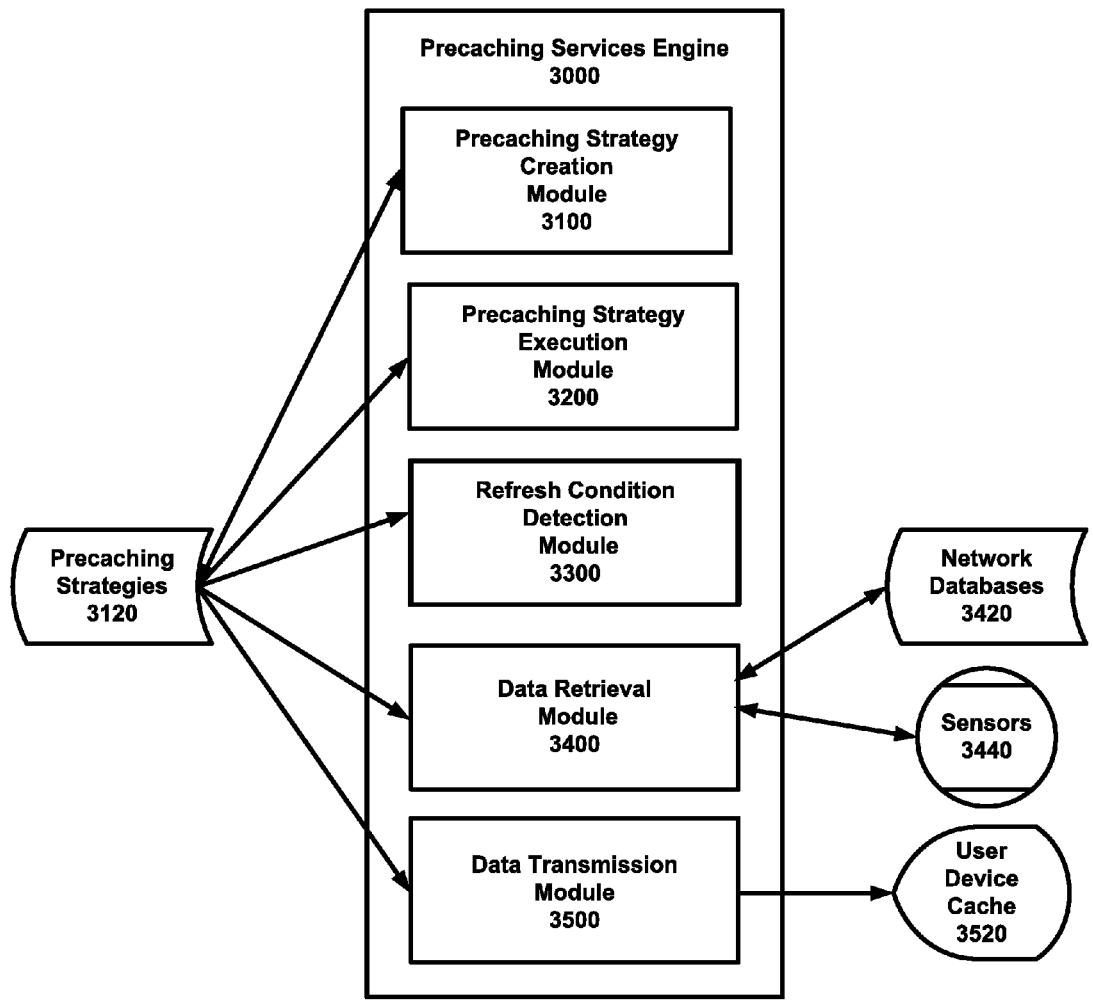
FIG. 4 illustrates one embodiment of a precaching services engine capable of supporting of at least one embodiment of the process shown in FIG. 3.

FIG. 4 illustrates one embodiment of a precaching services engine 3000 capable of supporting of at least one embodiment of the process shown in FIG. 3. The engine comprises a precaching strategy creation module 3100, a precaching strategy execution module 3200, a refresh condition detection module 3300, a data retrieval module 3400 and data transmission module 3500.

In one embodiment, each of the modules comprises one or more processors programmed to execute software code retrieved from a computer readable storage medium storing software for functions as described below. In one embodiment, each of the modules could be implemented on servers such as servers 400 and 1800 shown in FIGS. 1 and 2 respectively. Such an embodiment is purely exemplary, and all of the modules shown could be implemented in any combination on any number servers, as will be readily apparent to those skilled in the art.

The precaching strategy creation module 3100 is configured to build precaching strategies for mobile devices. Each of the precaching strategies define a forecast of at least one data type a user is predicted to request after the occurrence of at least one data refresh condition. A precaching strategy is built by recognizing at least one data usage pattern in data requested by a single user or a plurality of users over a time period. At a minimum, the data usage patterns comprise at least one data type. The plurality of users could be any identifiable group of users, such as all users or users on a social graph.

In one embodiment, at least some data usage patterns each additionally comprises at least one event that is correlated to the usage of the data, wherein the at least one event is used by the precaching strategy creation module 3100 to define at least one refresh condition within the respective precaching strategy. Such events can comprise spatial, temporal, social or topical events.

In one embodiment, data types in at least some data usage patterns are used by the precaching strategy creation module 3100 to select a predefined precaching strategy for the data types. In one embodiment predefined precaching strategy for data types are determined by the precaching strategy creation module by recognizing at least one data usage pattern in data requested by a second plurality of users, wherein the data usage pattern comprises the data types. In one embodiment, the data type in the data usage pattern can be used to select a predefined precaching strategy for a data type which represents a generic data type that encompasses the data type.

The precaching strategy execution module 3200 is configured to execute precaching strategies built by the precaching strategy creation module 3100. In one embodiment, a user's precaching strategy is executed whenever the user's mobile device is connected to the network and continues to execute as long as the user is connected to the network. In one embodiment, the precaching strategy only executes when the user is actively interacting with his or her mobile device.

The refresh condition detection module 3300 is configured to detect when data refresh conditions have occurred relating to precaching strategies executed by the precaching strategy execution module 3200.

The data retrieval module 3400 is configured to retrieving data, over a network, from at least one data source, wherein the retrieved data is retrieved according to precaching strategies for where the refresh condition detection module 3300 has detected that data refresh conditions have occurred.

The data transmission module 3500 is configured to transmit data retrieved by the data retrieval module the retrieved data, over the network, to user device caches accessible to at application programs running on the user devices.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising the steps of:
    building a precaching strategy, using a computing device, for a mobile device,
        such that the precaching strategy defines a forecast of a data type a user is predicted to request after the occurrence of a data refresh condition,
        such that the precaching strategy is built by recognizing, using the computing device, a data usage pattern in data requested by the user using the mobile device over a time period, wherein the data usage pattern comprises the data type and an event that is correlated to the usage of the data, wherein the event is used to define the refresh condition within the precaching strategy,
        the data type being one of: spatial data, temporal data, social data or topical data and the event being one of: a spatial event, a temporal event, a social event or a topical event, the event further being an event external to the computing device and the mobile device;
    executing the precaching strategy, using the computing device;
    detecting, using the computing device, that the data refresh condition has occurred;
    retrieving data, over a network, from a data source, such that the retrieved data is retrieved according to the precaching strategy;
    transmitting the retrieved data, over the network, to a mobile device cache accessible to an application program running on the mobile device.

2. The method of claim 1 wherein the data type is determined empirically by recognizing data usage patterns within data usage data.

3. The method of claim 1 wherein the data type is determined by a user type of the user.

4. The method of claim 3 wherein the user type is defined by the user.

5. The method of claim 3 wherein user type is assigned, using the computing device, to the user by identifying a pattern of data types and usage frequencies and correlating such patterns to the user type.

6. The method of claim 1 wherein the data type comprises a hierarchy of a plurality of data types and subtypes, wherein the plurality of data types and subtypes are organized in a plurality of levels.

7. The method of claim 6 wherein spatial, temporal, social and topical patterns of data usage and correlated events are recognized, using the computing device, and used to build strategies at every level of the plurality of levels of the data hierarchy.

8. A method comprising the steps of:
    building a precaching strategy, using a computing device, for a mobile device,
        such that the precaching strategy defines a forecast of a data type a user is predicted to request after the occurrence of a data refresh condition,
        such that the precaching strategy is built by recognizing, using the computing device, a data usage pattern in data requested by a plurality of users over a time period, such that the data usage pattern comprises the data type and an event that is correlated to the usage of the data, wherein the event is used to define the data refresh condition within the precaching strategy,
        the data type being one of: spatial data, temporal data, social data or topical data and the event being one of: a spatial event, a temporal event, a social event or a topical event, the event further being an event external to the computing device and the mobile device;
    executing the precaching strategy, using the computing device;
    detecting, using the computing device, that the data refresh condition has occurred;

retrieving data, over a network, from a data source, such that the retrieved data is retrieved according to the precaching strategy;

transmitting the retrieved data, over the network, to a mobile device cache accessible to an application program running on the mobile device.

9. The method of claim 8 wherein the plurality of users are selected from the user's social network.

10. The method of claim 8 wherein the data type in the data usage pattern is used to select a predefined precaching strategy for the data type.

11. The method of claim 10 wherein the predefined precaching strategy for the data type was determined by recognizing, using the computing device, a data usage pattern in data requested by a second plurality of users, wherein the data usage pattern comprises the data type.

12. The method of claim 10 wherein the data type in the data usage pattern is used to select a predefined precaching strategy for a data type which represents a generic data type that encompasses the data type.

13. A system comprising:
a processor;
a storage medium for tangibly storing thereon program logic for execution by the processor, the program logic comprising:
logic executed by the processor for building a precaching strategy for a mobile device, such that the precaching strategy defines a forecast of a data type a user is predicted to request after the occurrence of a data refresh condition,
such that the precaching strategy is built by recognizing a data usage pattern in data requested by a plurality of users over a time period, such that the data usage pattern comprises the data type and an event that is correlated to the usage of the data, wherein the event is used to define the data refresh condition within the precaching strategy,
the data type being one of: spatial data, temporal data, social data or topical data and the event being one of: a spatial event, a temporal event, a social event or a topical event, the event further being an event external to the computing device and the system;
logic executed by the processor for executing the precaching strategy;
logic executed by the processor for detecting that the data refresh condition has occurred;
logic executed by the processor for retrieving data, over a network, such that the retrieved data is retrieved according to the precaching strategy;
logic executed by the processor for transmitting the retrieved data, over the network, to a mobile device cache accessible to an application program running on the mobile device.

14. The system of claim 13 wherein the plurality of users are selected from the user's social network.

15. The system of claim 13 wherein the data type in the usage patterns is used to select a predefined precaching strategy for the data type.

16. The system of claim 15 wherein the predefined precaching strategy for the data type was determined by the precaching strategy creation module by recognizing data usage pattern in data requested by a second plurality of users, wherein the data usage pattern comprises the data type.

17. The system of claim 15 wherein the data type in the data usage pattern is used to select a predefined precaching strategy for a data type which represents a generic data type that encompasses the data type.

18. A non-transitory computer-readable medium having computer-executable instructions for a method comprising the steps of:
building a precaching strategy for a mobile device,
such that the precaching strategy defines a forecast of a data type a user is predicted to request after the occurrence of a data refresh condition,
such that the precaching strategy is built by recognizing a data usage pattern in data requested by a plurality of users over a time period, such that the data usage pattern comprises the data type and an event that is correlated to the usage of the data, wherein the event is used to define the data refresh condition within the precaching strategy,
the data type being one of: spatial data, temporal data, social data or topical data and the event being one of: a spatial event, a temporal event, a social event or a topical event, the event further being an event external to the mobile device;
executing the precaching strategy;
detecting that the data refresh condition has occurred;
retrieving data, over a network, from data source, such that the retrieved data is retrieved according to the precaching strategy;
transmitting the retrieved data, over the network, to a mobile device cache accessible to an application program running on the mobile device.

19. The non-transitory computer-readable medium of claim 18 wherein the plurality of users are selected from the user's social network.

20. The non-transitory computer-readable medium of claim 18 wherein the data type in the data usage pattern is used to select a predefined precaching strategy for the data type.

21. The non-transitory computer-readable medium of claim 20 wherein the predefined precaching strategy for the data type was determined by recognizing a data usage pattern in data requested by a second plurality of users, wherein the data usage pattern comprises the data type.

22. The non-transitory computer-readable medium of claim 20 wherein the data type in the data usage pattern is used to select a predefined precaching strategy for a data type which represents a generic data type that encompasses the data type.

* * * * *